US012011925B2

(12) United States Patent
Byun et al.

(10) Patent No.: US 12,011,925 B2
(45) Date of Patent: Jun. 18, 2024

(54) PRINTING APPARTUS

(71) Applicant: ENJET CO. LTD., Gyeonggi-do (KR)

(72) Inventors: Do Young Byun, Seoul (KR); Vu Dat Nguyen, Gyeonggi-do (KR)

(73) Assignee: ENJET CO. LTD., Suwon-si (KR)

( * ) Notice: Subject to any disclaimer, the term of this patent is extended or adjusted under 35 U.S.C. 154(b) by 0 days.

(21) Appl. No.: 17/816,918

(22) Filed: Aug. 2, 2022

(65) Prior Publication Data

US 2023/0041012 A1 Feb. 9, 2023

(30) Foreign Application Priority Data

Aug. 5, 2021 (KR) ........................ 10-2021-0103048
Dec. 23, 2021 (KR) ........................ 10-2021-0185715

(51) Int. Cl.
*B41J 2/14* (2006.01)
*B41J 2/135* (2006.01)

(52) U.S. Cl.
CPC ........... *B41J 2/14314* (2013.01); *B41J 2/135* (2013.01); *B41J 2202/02* (2013.01); *B41J 2202/15* (2013.01)

(58) Field of Classification Search
CPC ...... B41J 2/162; B41J 2/1433; B41J 25/3082; B41J 2/135; B41J 2/06; B41J 2002/14475; B41J 2202/02; B41J 2202/15; B41J 2/14314; B41J 2/16532
See application file for complete search history.

(56) References Cited

U.S. PATENT DOCUMENTS

| | | | |
|---|---|---|---|
| 10,807,358 | B2 | 10/2020 | Byun et al. |
| 2019/0240979 | A1 | 8/2019 | Byun et al. |

FOREIGN PATENT DOCUMENTS

| | | |
|---|---|---|
| CN | 105774235 A | 7/2016 |
| KR | 10-2010-0135596 | 12/2010 |
| KR | 10-2011-0125013 | 11/2011 |
| KR | 10-1708594 | 2/2017 |
| KR | 10-2020-0122228 | 10/2020 |
| KR | 10-2020-0136374 | 12/2020 |

*Primary Examiner* — Kristal Feggins
(74) *Attorney, Agent, or Firm* — Jason Lee DeFrancesco

(57) ABSTRACT

The present disclosure relates to a printing apparatus, and the printing apparatus according to the present disclosure includes an optical unit for expanding and displaying a hitting point of ink, from above a substrate; and a nozzle unit for ejecting the ink, wherein the nozzle unit includes a nozzle body that is obliquely disposed with respect to the substrate; and a nozzle that is coupled to the nozzle body, and has a flow path from which the ink is ejected, and has a tip that is bended towards the substrate.

12 Claims, 5 Drawing Sheets

(a)

(b)

PRINTING APPARTUS

FIELD

The present disclosure relates to a printing apparatus, and more particularly, to a printing apparatus capable of performing printing while observing a hitting point of ink and improving hitting precision.

BACKGROUND

In general, an inkjet apparatus for jetting fluid in the form of droplets has been mainly applied to inkjet printers in the past, but recently it is widely applied in high-tech industries such as display manufacturing processes, printed circuit board manufacturing processes, DNA chip manufacturing processes, etc.

An inkjet apparatus is an apparatus for ejecting droplets from ink having the state of fluid. Inkjet apparatuses can be classified as thermal type inkjet apparatuses and piezoelectric type inkjet apparatuses depending on the method of ejecting the droplets. Recently, for ultra-fine printing, electrostatic jet printers using the electrohydrodynamic method are widely used.

An electrostatic jet printer ejects charged ink by using the electrostatic force generated by a potential difference that occurs when a voltage is applied between a nozzle and a substrate. Since the electrostatic jet printer ejects droplets or continuous jets using the force that pulls the liquid surface with electrostatic force, unlike other conventional types of jet printers, it is known to have various advantages including that nano-scale patterning is possible, high-viscosity ink can be ejected, and uniform droplet generation is possible.

Meanwhile, in order to perform precise printing, attempts are being made for printing apparatuses where ink can be ejected with the nozzle unit obliquely disposed with respect to the substrate, which is the hitting point, and printing being performed while the hitting point of the ink can be observed using an optical unit such as a camera above the substrate to adjust the position of the nozzle.

Here, droplets are ejected and hit the substrate according to the inclination direction of the nozzle unit. In the absence of an electric field, the droplets hit the substrate under the influence of gravity and inertial force, and when an electric field of an electrohydrodynamic method is applied, the trajectory of the droplets changes depending on the charge density of the droplets and the intensity of the electric field and the droplets may hit the substrate according to the distribution of the electric field.

When performing printing by ejecting droplets in an inclined direction through an inclined nozzle unit as described above, sometimes printing is performed while moving the nozzle unit in a Z axial direction (a direction that is perpendicular to the substrate), in which case there is a problem that even when the nozzle unit moves slightly in the Z axial direction, the hitting position of the droplets is changed significantly by the inclined angle of the nozzle. That is, since the nozzle unit is disposed obliquely, the longer the moving distance of the nozzle unit in the Z axial direction, themore the hitting precision of the ink will deteriorate.

Thus, in the present disclosure, proposed hereinbelow is a printing apparatus where a nozzle unit is obliquely disposed to eject ink in an inclined direction, and by maintaining the base structure of performing printing while observing the point that the ink hits from above the substrate, the hitting precision can also be improved.

PRIOR ART LITERATURE

Patent Literature

Korean Laid-open Patent no. 10-2017-0072748

SUMMARY

Therefore, a purpose of the present disclosure is to resolve the aforementioned problems of prior art, that is, to provide a printing apparatus where a nozzle tip of the nozzle unit obliquely disposed with respect to the substrate is bended towards the substrate, so that even when printing is performed while moving the nozzle unit in a Z axial direction, a high hitting precision can be maintained.

The tasks that the present disclosure intends to resolve are not limited to the aforementioned tasks, but rather, other tasks not mentioned herein will be clearly understood by those skilled in the art from the following description.

The aforementioned purpose can be achieved by a printing apparatus according to the present disclosure, the printing apparatus including an optical unit for expanding and displaying a hitting point of ink, from above a substrate; and a nozzle unit for ejecting the ink, wherein the nozzle unit includes a nozzle body that is obliquely disposed with respect to the substrate; and a nozzle that is coupled to the nozzle body, and has a flow path from which the ink is ejected, and has a tip that is bended towards the substrate.

Here, the optical unit may expand and display the hitting point of ink from vertically above the substrate.

Here, the nozzle unit may further include an electrode where a high voltage is applied, and may eject the ink using an electrostatic force caused by a potential difference between the electrode and the substrate.

Here, the electrode may be interposed inside the nozzle unit or formed on an inner side of the nozzle unit.

Here, the electrode may be separated by an insulator not to contact with the ink inside the nozzle unit.

Here, the nozzle unit may further include an air-purging part for applying pneumatic pressure inside the nozzle body to eject the ink in the nozzle prior to printing.

Here, a nozzle align part for aligning a rotation position of the bended tip of the nozzle around an axial direction of the nozzle body may be further included.

Here, the nozzle align part may include a rotation driving part for rotating the nozzle body in the axial direction.

Here, the optical unit may obtain an image of the tip of the nozzle from vertically above the substrate, and the nozzle align part may align the rotation position of the nozzle based on information of the obtained image.

Here, the nozzle may be mounted on the nozzle body such that it is replaceable.

Here, the tip of the nozzle may be bended such that an angle between a normal of the substrate and the tip of the nozzle is within 45 degrees.

Here, a diameter of the nozzle may be several tens of μm or less.

Here, the diameter of the nozzle may be 1 μm or less.

According to the printing apparatus of the present disclosure described above, there is an advantage that since the printing is performed while observing the hitting point of the ink using an optical unit positioned above the substrate and ejecting the ink in an inclined direction through the nozzle unit obliquely disposed with respect to the substrate, the printing precision is high.

Further, there is also an advantage that since the nozzle tip of the obliquely disposed nozzle unit is bended towards the substrate, even when performing printing while moving the nozzle unit in the Z axial direction, a high printing precision can be maintained.

DETAILED DESCRIPTION

Figure 1:
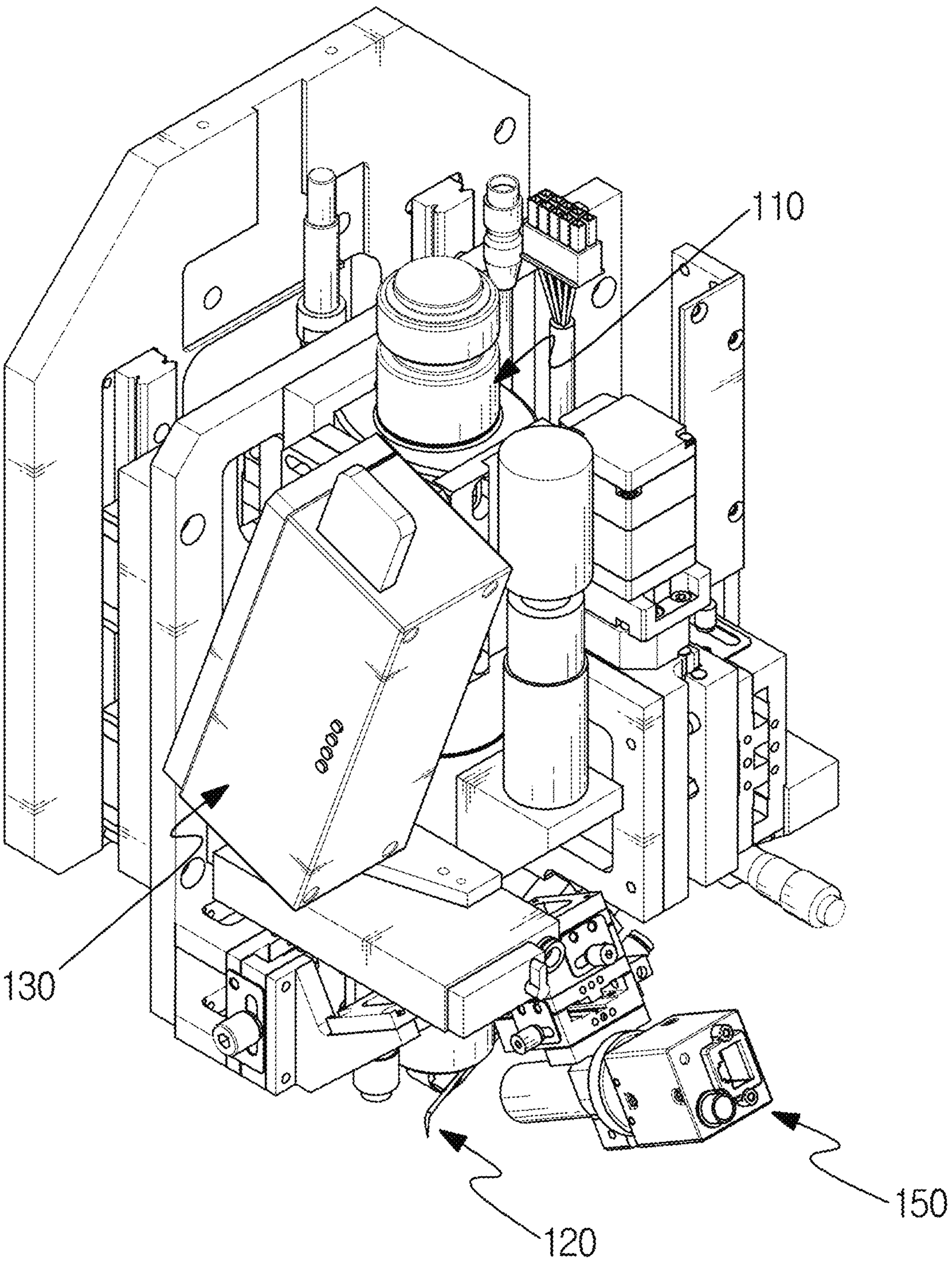
FIG. 1 illustrates a perspective view of a printing apparatus according to an embodiment of the present disclosure.

The specific details of the embodiments are included in the detailed description and the drawings.

Advantages and features of the present disclosure, and methods for achieving them will become apparent with reference to the embodiments described below in detail together with the accompanying drawings. However, the present disclosure is not limited to the embodiments disclosed below, but can be implemented in various different forms, and these embodiments are provided to allow the disclosure of the present disclosure to be complete, and to fully inform the scope of the present disclosure to those with common knowledge in the art to which the present disclosure pertains, and the present disclosure is merely defined by the scope of the claims. Like reference numerals indicate like elements throughout the specification.

Hereinbelow, the present disclosure will be described with reference to the drawings for describing the printing apparatus according to the embodiments of the present disclosure.

Figure 2:
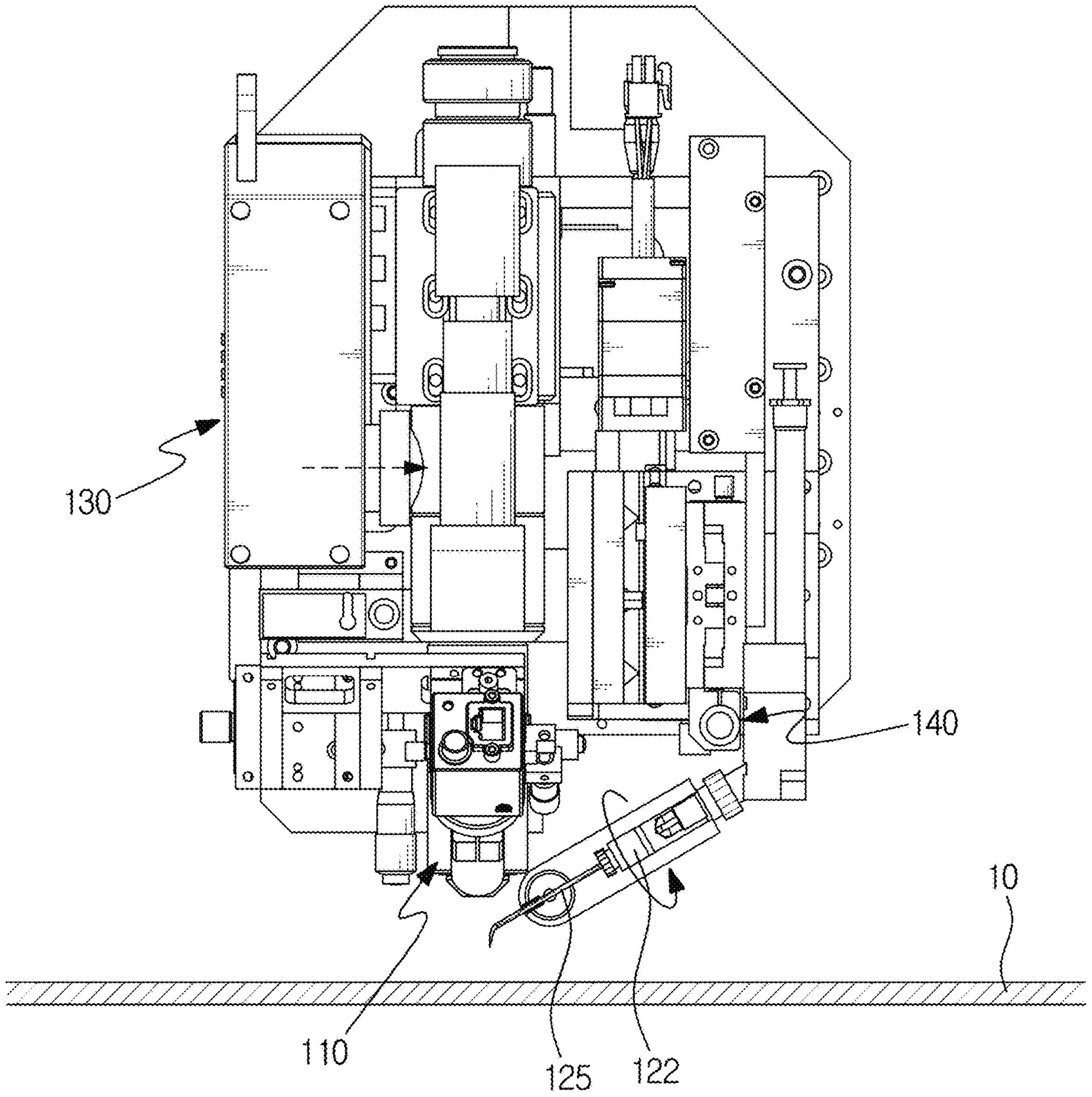
FIG. 2 illustrates a front view of FIG. 1.
Figure 3:
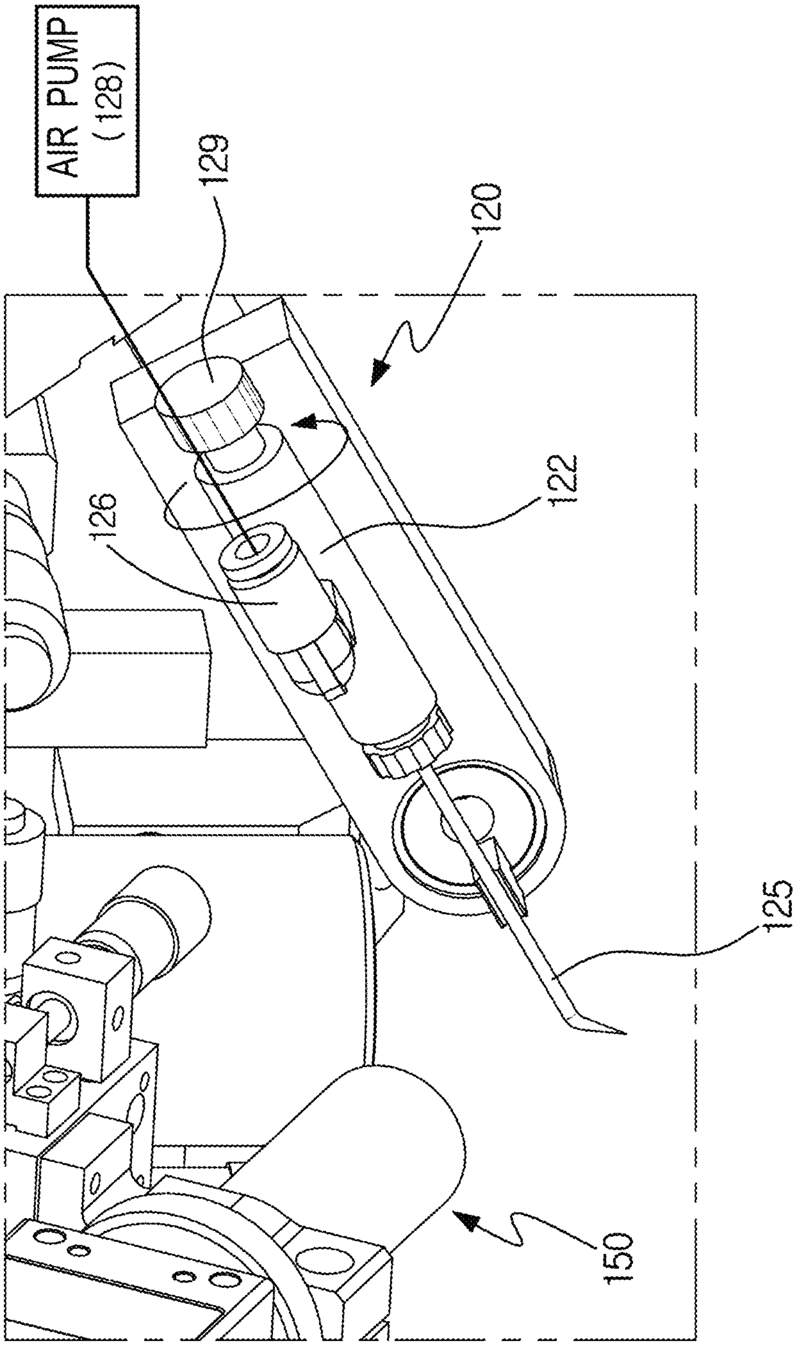
FIG. 3 illustrates an expanded view of the nozzle unit of FIG. 1.
Figure 4:
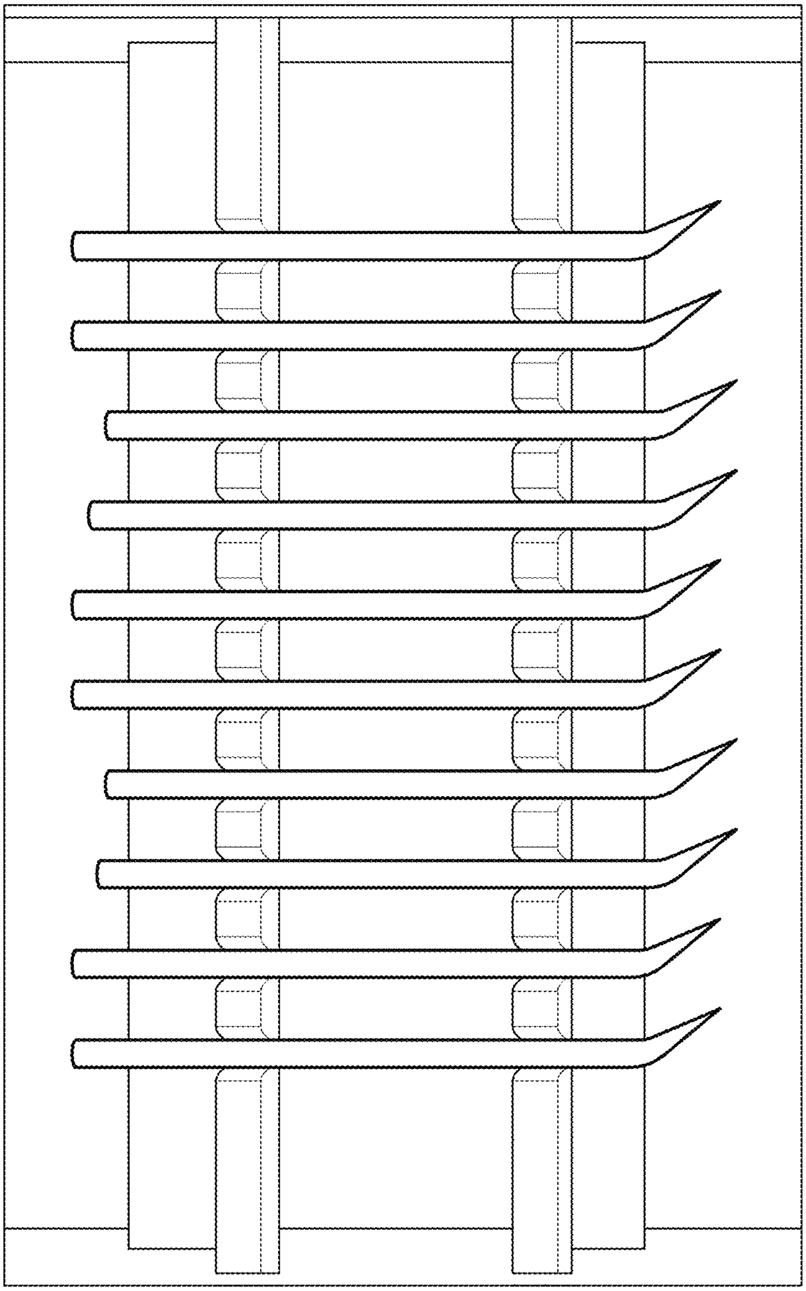
FIG. 4 is a photo of various types of nozzles prepared according to the present disclosure.
Figure 5:
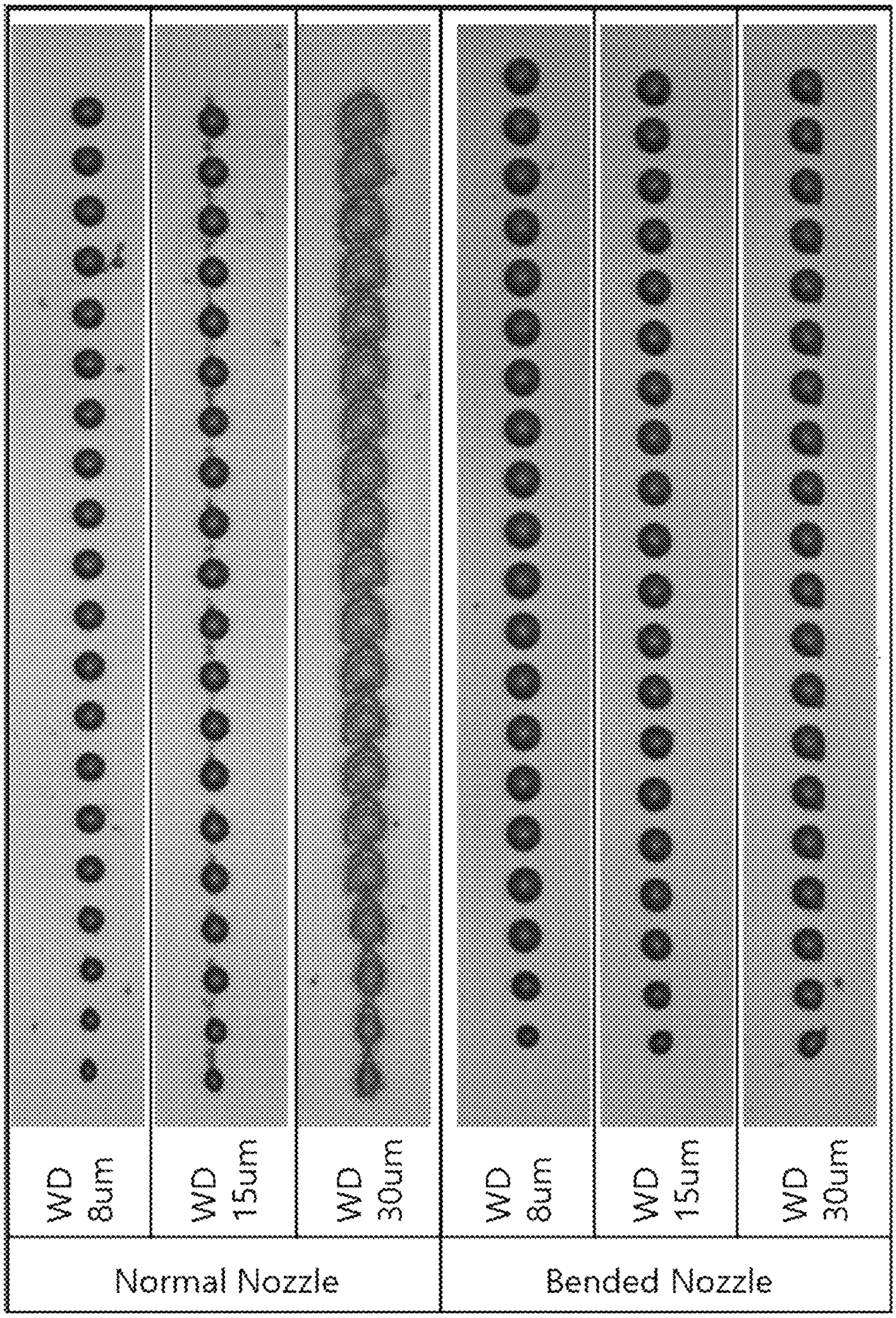
FIG. 5 illustrates the results of jetting tests conducted using the prior art nozzles having a straight line form and bended nozzles according to the present disclosure.

FIG. 1 illustrates a perspective view of a printing apparatus according to an embodiment of the present disclosure, FIG. 2 illustrates a front view of FIG. 1, FIG. 3 illustrates an expanded view of the nozzle unit of FIG. 1, FIG. 4 is a photo of various types of nozzles prepared according to the present disclosure, and FIG. 5 illustrates the results of jetting tests conducted using the prior art nozzles having a straight line form and bended nozzles according to the present disclosure.

The printing apparatus according to an embodiment of the present disclosure may be configured to include an optical unit 110 and a nozzle unit 120. Further, a distance measurement unit 130 or a moving unit 150 may be further included.

The optical unit 110 is a camera that, from above a substrate 10, displays an expanded image of a point hit by ink, through a separate display apparatus (not illustrated).

It is preferable that the optical unit 110 photographs the hitting point of the ink downwards from vertically above the substrate 10. That is because, when photographing the hitting point in an inclined direction, a distortion of image may occur, but when the hitting point is photographed vertically above the substrate 10, the hitting point can be photographed without any distortion. However, a separate optical unit 150 that photographs the hitting point from the side may be further included.

The nozzle unit 120 ejects ink towards the substrate 10. In the present embodiment, the nozzle unit 120 uses an electrohydrodynamic method to eject ink charged by electrostatic force by an electric field between the substrate 10 and the nozzle unit 120 as droplets, but is not necessarily limited thereto. The ink may be ejected by a thermal method, a piezoelectric method, or a hybrid method in which the above methods are combined.

The nozzle unit 120 according to an embodiment of the present disclosure may be configured to include a nozzle body 122 and a nozzle 125. In addition, an air-purging part or a nozzle align part may be further included.

The nozzle body 122 may be a body that forms the nozzle unit 120, and a sealed chamber may be formed inside the nozzle body 122 so that ink can be stored therein. The chamber may have a separate ink inlet for communicating with outside, so that consumed ink can be filled from a syringe pump (not illustrated) and the like.

In the present disclosure, the nozzle body 122 is obliquely disposed with respect to the substrate 10. Since the ink is ejected in an inclined direction in a state where the nozzle body 122 is obliquely disposed, it is possible to photograph an image of the ink hitting point through the optical unit 110 disposed above the hitting point without any interference. Therefore, based on the image information obtained by photographing the ink hitting point, it is possible to perform printing while moving the nozzle unit 120, and thus the hitting precision of ink droplets can be further increased.

The nozzle 125 is coupled to the nozzle body 122, and a flow path is formed therein to eject the ink stored in the nozzle body 122 to the outside. In the present disclosure, the nozzle 125 has a tip that is made in a downwardly bended form towards the substrate 10. Therefore, the flow path inside the nozzle 125 may be made in a bended form as well.

In the present disclosure, in a printing process, the nozzle unit 120 may perform printing while moving in a direction perpendicular to the Z axial direction (substrate 10). Here, as the nozzle 125 including the nozzle unit 120 is obliquely disposed, there occurs a problem that when the nozzle unit 120 moves in the Z axial direction, the hitting point changes significantly. However, in the present disclosure, the tip of the nozzle 125 is made in a bended form towards the substrate 10, so that the inclination angle at which the ink is ejected based on the normal direction perpendicular to the substrate 10 can be reduced as much as possible, and thus even when printing is performed as the nozzle unit 120 moves in the Z axial direction, a high hitting precision can be maintained. Further, through the optical unit 110 positioned vertically above the substrate 10, an image of the hitting point of the ink droplet including the tip of the nozzle 125 can be photographed without interference.

A droplet ejected in the electrohydrodynamic inkjet method is electrically charged, and due to the electric field distributed in the space, an electrostatic force continuously acts on the droplet. The electrostatic force, gravity, and inertial force acting on the droplet determine the trajectory in which the droplet flies towards the substrate. The electric field is expressed in the Maxwell equation.

$$\nabla \cdot \varepsilon \nabla \phi = -\rho$$

$$E = -\nabla \phi$$

Here, E is the external electric field (V/m), $\phi$ is the electric potential (V), $\varepsilon$ is the permittivity (Coulomb/Vm), and $\rho$ is the charge density (Coulomb/$m^3$).

The flying speed and trajectory of the droplet can be obtained by the equation according to Newton's second law below.

$$m\frac{\partial v}{\partial t} = q_{drop}E + mg$$

Here, v is the droplet's speed (m/s), t is the time (second), g is the acceleration of gravity, $q_{drop}$ is the droplet's electric charge quantity (Coulomb), and m is the droplet's mass (kg).

Therefore, according to the curvature of the nozzle, the ejection direction of the droplet will be towards the substrate closer to perpendicularly, and the hitting accuracy and precision may be improved. The distribution of the electric field may differ depending on the position and shape of the nozzle applying the voltage, size of the substrate, material of the substrate, printing environment, ink viscosity, ink density, electrical conductivity of the ink, and dielectric constant of the ink, etc.

The bended nozzle can form an electric field streamline in the perpendicular direction between the nozzle and the substrate, which contributes to the precision of the charged droplet hitting the substrate.

FIG. 4 illustrates nozzles 125 prepared in various forms. The nozzle 125 can be changed in various ways for example by changing the diameter of the flow path inside the nozzle 125, changing the bended angle of the tip of the nozzle 125, and changing the length of the bended tip of the nozzle 125, and then replaced and mounted on the nozzle body 122. Here, the diameter of the nozzle may be variously formed in the range between several μm to tens of μm. Otherwise, the diameter of the nozzle may be 1 μm or less.

Supposing the nozzle body 122 is disposed obliquely at an angle of about 45 degrees with respect to the substrate 10, it is preferable that the bended angle of the tip of the nozzle 125 is within 45 degrees. Therefore, the tip of the nozzle 125 may be formed to be bended such that the angle between the normal of the substrate 10 and the tip of the nozzle 125 is within 45 degrees. The angle of the tip of the nozzle 125 may be variously changed according to the angle at which the nozzle body 122 is obliquely disposed. Here, it is preferable that the disposed angle of the nozzle body 122 and the bended angle of the tip of the nozzle 125 are set such that the nozzle 125 tip and the ink being ejected through the nozzle 125 tip can be photographed through the optical unit 110 above the substrate 10.

In the present disclosure, since the nozzle unit 120 ejects ink in the electrohydrodynamic method, an electrode (not illustrated) where a high voltage can be applied may be formed inside or outside the nozzle unit 120.

The electrode may be interpolated inside the nozzle 125 or formed on an inner side of a chamber or the nozzle 125, and configured to directly contact the ink. Otherwise, the electrode may be separated by an insulator, and disposed inside or outside the nozzle 125 in a form that it does not directly contact with the ink inside the nozzle 125. For example, the electrode may be coated as an insulator and made in a form that is interpolated inside the nozzle 125. As another method, the nozzle 125 may be formed as an insulator, and the electrode may be disposed on an outer wall of the nozzle 125 or disposed away from the nozzle 125. As another method, the nozzle 125 itself may be made with a conductive material and be used as an electrode, while the nozzle 125 is coated as an insulator. As such, even when the electrode where a high voltage is applied does not directly contact the ink inside the nozzle 125, the ink can be charged with induced electric force by having an insulator in therebetween, and the electrode may form an electric field towards the substrate to eject the charged ink with the electrostatic force.

Further, in the nozzle unit 120, an air-purging part for applying pneumatic pressure inside the nozzle body 122 may be further included.

As the tip of the nozzle 125 of the present disclosure is formed to be bended as described above, in the process of filling the ink inside the nozzle 125 prior to printing, air can be trapped, keeping the ink from being ejected normally at the initial stage. Thus, in the present disclosure, prior to printing, after ejecting the ink filled in the nozzle 125 by applying pneumatic pressure inside the nozzle body 122 through the air-purging part, printing may be performed.

As illustrated in FIG. 3, at an outer side of the nozzle body 122, an air inlet 126 is formed that communicates with the chamber inside. Through the air inlet 126, high pressure air can be supplied inside the nozzle unit 120, to eject the ink filled inside the nozzle 125 prior to printing.

Therefore, the air-purging part may be configured to include an air pump 280 that is connected with the air inlet 126 to supply high pressure air, and a controller (not illustrated) that controls to move the nozzle unit 120 prior to printing to a predetermined position and to operate the air pump 280 to eject the ink inside the nozzle 125.

In addition, a nozzle align part may be further included in the nozzle unit 120. Since the tip of the nozzle 125 of the present disclosure is bended as described above, it is important to align the position of the tip being bended. More specifically, it is important to make a position alignment such that the nozzle 125 including the bended tip of the nozzle 125 can be positioned on a virtual surface formed by the normal of the substrate 10 where the droplet is being ejected and by an axial line of the nozzle body 122.

Therefore, the nozzle align part aligns a rotation position of the bended tip of the nozzle 125 based on the axial direction of the nozzle body 122. For example, the nozzle align part may be configured as a rotation driving part 129 that rotates the nozzle body 122 in the axial direction. As illustrated, a rear end of the nozzle body 122 may be connected to the rotation driving part 129 so that it can receive a driving force from the rotation driving part 129 and rotate around the axial direction of the nozzle body 122. By the axial direction rotation of the nozzle body 122, the nozzle 125 coupled to the nozzle body 122 rotates together as well in the axial direction. Therefore, it is possible to photograph the bended tip (nozzle tip) of nozzle 125 through the optical unit 110, and based on the information of the photographed image, it is possible to rotate the nozzle body 122 using the rotation driving part 129, thereby aligning the position of the tip of the nozzle 125.

The printing apparatus according to an embodiment of the present disclosure may further include a distance measurement unit 130 and a moving unit 150.

The distance measurement unit 130 and the moving unit 150 operate to maintain a certain distance between the substrate 10 and the tip of the nozzle 125.

The distance measurement unit 130 measures the distance between the substrate 10. For example, the distance measurement unit 130 may be formed as a laser distance sensor that uses laser to measure distance. As illustrated, the distance measurement unit 130 may be formed at one side of the optical unit 110 to irradiate laser towards the body part of the optical unit 110. On the body part of the optical unit 110, a reflector (not illustrated) for changing the path of the laser may be formed at a predetermined position so as to irradiate the laser beam irradiated from the distance measurement unit 130 toward the substrate 10, and receive the laser beam reflected back from the substrate 10 again, and measure the distance with the substrate 10 using the speed of the laser beam and the time difference of receiving and sending the laser beam.

Once the position of the nozzle unit 120 and distance is obtained from the distance measurement unit 130, the distance between the substrate 10 and the tip of the nozzle 125 can be obtained. By operating the moving unit 150 that moves the nozzle unit 120 in X, Y, Z axial directions, it is possible to maintain a certain distance between the tip of the nozzle 125 of the nozzle unit 120 and the substrate 10.

The moving unit 150 is a unit that moves the nozzle unit 120 in three axial directions using a motor. Since it is the same as a prior art configuration, detailed description regarding the moving unit will be omitted.

FIG. 5 shows the result of performing a jetting test while changing the Z axial distance from the nozzle tip to the substrate. In the case of obliquely disposing a normal nozzle having a straight line form, not only does a problem occur in terms of hitting precision, but also, due to the nozzle's inclination with respect to the substrate, the electric field density at the nozzle tip will be dispersed, keeping the droplets from being ejected evenly and uniformly, and may also show a tendency of being splashed on the substrate. On the other hand, in the case where a bended nozzle is obliquely disposed as in the present disclosure, it is noted that the tip of the nozzle can be disposed closer to a perpendicular direction with respect to the substrate, and thus according to the distribution of the electric field formed in a perpendicular direction towards the substrate, the electric field can be concentrated to the droplet at the tip of the nozzle as well, allowing the droplet to be ejected uniformly and improving the hitting precision.

The scope of rights of the present disclosure is not limited to the aforementioned embodiments, but can be implemented in various forms of embodiments within the scope of the accompanying claims set. It should be understood that various changes and alternations can be made without departing from the spirit and field of the present disclosure claimed in the claims set.

REFERENCE NUMERALS

10: SUBSTRATE
110: OPTICAL UNIT
120: NOZZLE UNIT
122: NOZZLE BODY
125: NOZZLE
126: AIR INLET
128: AIR PUMP
129: ROTATION DRIVING PART
130: DISTANCE MEASUREMENT UNIT
140: MOVING UNIT

What is claimed is:

1. A printing apparatus comprising:
an optical unit for expanding and displaying a hitting point of ink, from above a substrate; and
a nozzle unit for ejecting the ink,
wherein the nozzle unit comprises a nozzle body that is obliquely disposed with respect to the substrate; and
a nozzle that is coupled to the nozzle body and is obliquely disposed together with the nozzle body, has a flow path from which the ink is ejected, and has a tip that is bended towards the normal direction perpendicular to the substrate.

2. The printing apparatus according to claim 1,
wherein the optical unit expands and displays the hitting point of ink from vertically above the substrate.

3. The printing apparatus according to claim 1,
wherein the nozzle unit further comprises an electrode where a high voltage is applied, and
ejects the ink using an electrostatic force caused by a potential difference between the electrode and the substrate.

4. The printing apparatus according to claim 3,
wherein the electrode is interposed inside the nozzle unit or formed on an inner side of the nozzle unit.

5. The printing apparatus according to claim 3,
wherein the electrode is separated by an insulator not to contact with the ink inside the nozzle unit.

6. The printing apparatus according to claim 1,
further comprising a nozzle align part for aligning a rotation position of the bended tip of the nozzle around an axial direction of the nozzle body.

7. The printing apparatus according to claim 6,
wherein the nozzle align part comprises a rotation driving part for rotating the nozzle body in the axial direction.

8. The printing apparatus according to claim 6,
wherein the optical unit obtains an image of the tip of the nozzle from vertically above the substrate, and
the nozzle align part aligns the rotation position of the nozzle based on information of the obtained image.

9. The printing apparatus according to claim 1,
wherein the nozzle is mounted on the nozzle body such that it is replaceable.

10. The printing apparatus according to claim 1,
wherein the tip of the nozzle is bended such that an angle between a normal of the substrate and the tip of the nozzle is within 45 degrees.

11. The printing apparatus according to claim 1,
wherein a diameter of the nozzle is several tens of μm or less.

12. The printing apparatus according to claim 11,
wherein the diameter of the nozzle is 1 μm or less.

* * * * *